United States Patent

Suau

[11] 4,087,740
[45] May 2, 1978

[54] SPHERICAL FOCUSING METHOD AND APPARATUS FOR DETERMINING THE THICKNESS OF A ZONE IN AN EARTH FORMATION TRAVERSED BY A BOREHOLE

[75] Inventor: Jean Suau, Saint-Cloud, France

[73] Assignee: Schlumberger Technology Corporation, New York, N.Y.

[21] Appl. No.: 575,070

[22] Filed: May 6, 1975

Related U.S. Application Data

[63] Continuation of Ser. No. 324,906, Jan. 19, 1973, abandoned.

[51] Int. Cl.² ............................................. G01V 3/18
[52] U.S. Cl. ...................................................... 324/10
[58] Field of Search ...................................... 324/1, 10

[56] References Cited

U.S. PATENT DOCUMENTS

| | | | |
|---|---|---|---|
| 2,965,838 | 12/1960 | Kister | 324/10 X |
| 3,002,148 | 9/1961 | Nall | 324/1 |
| 3,014,174 | 12/1961 | Charrin et al. | 324/10 X |
| 3,075,142 | 1/1963 | Albright et al. | 324/1 |
| 3,136,942 | 6/1964 | Schuster | 324/10 X |
| 3,462,678 | 8/1969 | Eaton | 324/10 |
| 3,579,098 | 5/1971 | Mougne | 324/10 |
| 3,697,864 | 10/1972 | Runge | 324/10 |
| 3,760,260 | 9/1973 | Schuster | 324/10 |

Primary Examiner—Gerard R. Strecker

[57] ABSTRACT

An electrical well logging apparatus of the spherically focusing type is utilized to determine the diameter of a borehole drilled into a formation or the thickness of the mudcake on the borehole wall.

14 Claims, 5 Drawing Figures

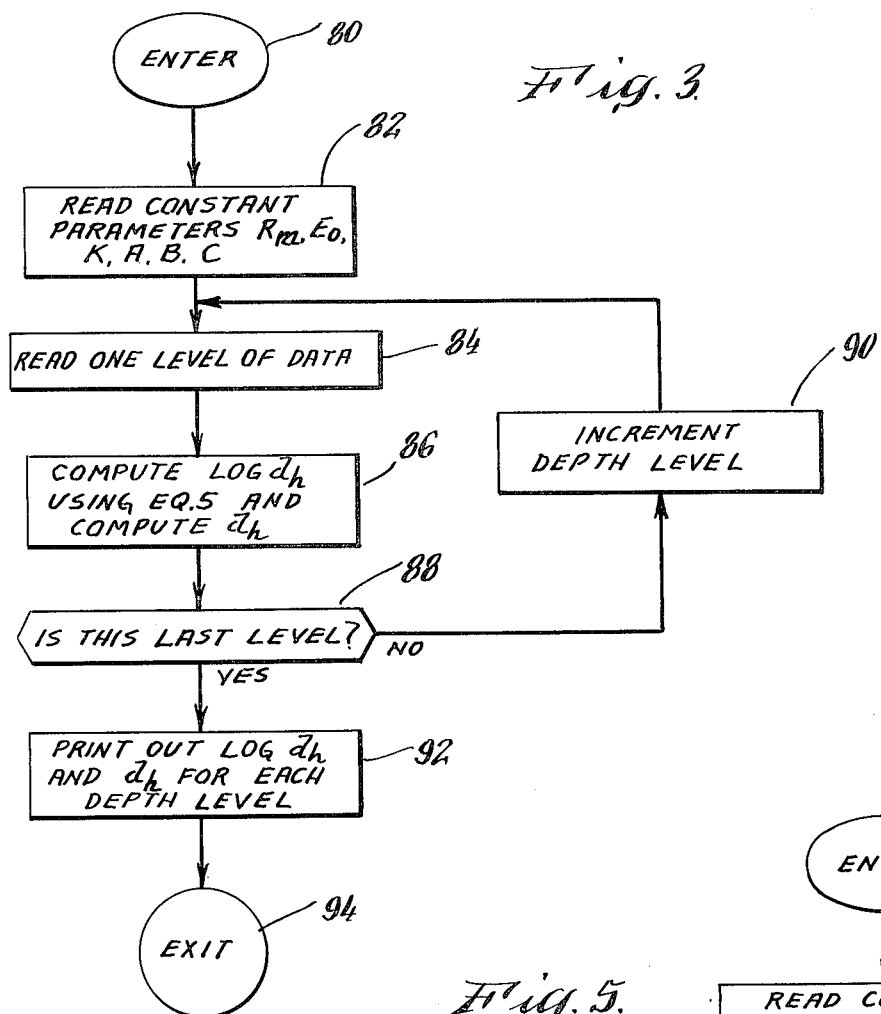
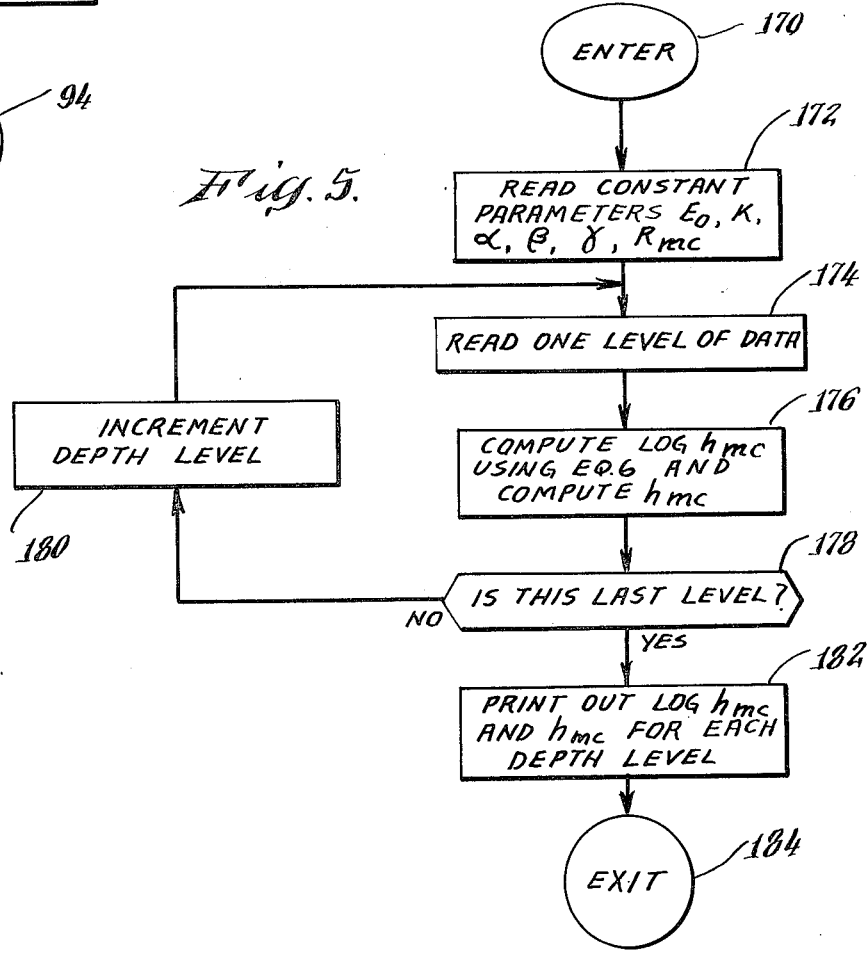

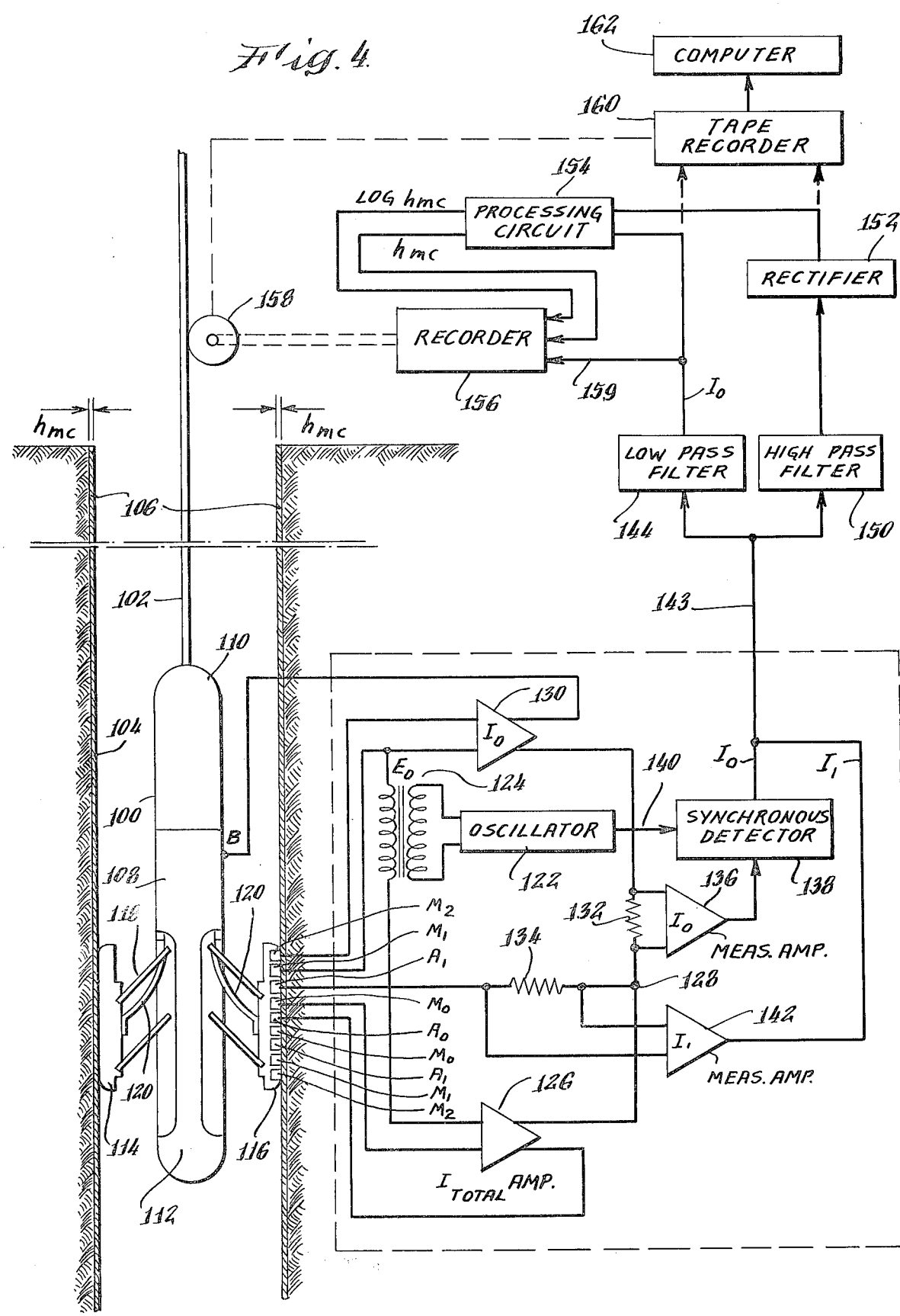

SPHERICAL FOCUSING METHOD AND APPARATUS FOR DETERMINING THE THICKNESS OF A ZONE IN AN EARTH FORMATION TRAVERSED BY A BOREHOLE

This is a continuation, of application Ser. No. 324,906 filed Jan. 19, 1973, now abandoned.

BACKGROUND OF THE INVENTION

This invention relates to well logging methods and apparatus for investigating subsurface formations traversed by a borehole and more particularly to methods and apparatus using electrode systems for determining the average lateral thickness of a zone in the borehole.

When drilling a well, it is customary to use drilling mud containing fine, solid particles in suspension. As the hydrostatic pressure of the mud column is generally higher than the internal pressure of the formations, this mud has a tendency to penetrate into the permeable formations. A mudcake then forms along the wall of the borehole while the filtrate penetrates into the permeable layers, driving out at least partially, the fluid initially contained in these formations. On the other hand, there is practically no mudcake at the level of the impermeable formations into which the mud filtrate does not penetrate. Therefore, knowledge of the presence or absence of this mudcake allows the permeable layers to be differentiated from the impermeable layers.

Moreover, knowing the mudcake thickness makes it possible to determine its influence on the well logging measurements carried out in the borehole. When the mudcake thickness is large, the response of a pad mounted well logging apparatus having a small lateral investigation depth is influenced by the characteristics of this mudcake. A correction may be required in order to obtain the actual characteristics of the formation. In certain cases, the error introduced by the presence of the mudcake may be sufficiently great so as to make the measurements ususable. It is thus very important to determine whether or not the mudcake exceeds a given thickness beyond which a measurement is uncertain and requires correction. In addition, if the mudcake thickness is known with sufficient accuracy, it is possible to correct the measurement and thereby increase the utilization range of a given apparatus.

Various apparatus have been used to obtain information on the mudcake. One of these, described in U.S. Pat. No. 3,462,678 comprises a system of electrodes mounted on a pad. A survey current is emitted into the formation and the resistivities of two formation zones of different lateral thickness are measured. The resistivity of the zone nearest the borehole is influenced in particular by the presence of the mudcake while the resistivity of the second zone which extends deeper into the formation is relatively less sensitive to the presence of the mudcake. Processing circuits generate a signal indicative of the difference or of the ratio of these two resistivities, thereby providing information on the presence or absence of mudcake and an estimation of its thickness.

The measurement obtained using this technique, however, is not very sensitive to the thickness of the mudcake when this thickness is relatively large. Furthermore, these measurements are generally influenced by the contrast between the resistivity of the mudcake, $R_{MC}$ and the resistivity $R_{xo}$, of the zone into which the filtrate has penetrated. It is then necessary to introduce a correction factor dependent on the ratio, $R_{xo}/R_{MC}$ which factor can only be approximate owing to the fact that the thicker the mudcake, the more difficult it is to obtain the value, $R_{xo}$.

It is also useful to know the average diameter of the borehole. This makes it possible to determine, in particular, the influence of the drilling mud and of the size of the borehole on the well logging measurements. In the past, the diameter of the borehole has been obtained by an apparatus equipped with articulating arms which are applied against the wall of the borehole. The spreading of these arms gives a measurement of the borehole diameter.

Recently, well logging with electrodes of a new type, sometimes referred to as "spherical focussing" apparatus have been made. They are described in U.S. Pat. No. 3,760,260 issued Sept. 18, 1973 to N. Schuster and assigned to the same assignee as this application. In this system, current electrodes associated with A.C. generators emit a main current $I_o$ and an auxiliary current $I_1$ from a central electrode. One of the current generators is controlled by a control loop connected to two potential electrodes so that the auxiliary current forces the main current to penetrate into the formation. The ratio of the main current $I_o$ to the potential difference $E_o$, measured between two potential electrodes give a measurement of a conductivity of a formation zone, which measurement is only slightly influenced by the resistivity of the zone (mud or mudcake) located between electrodes and the formation.

SUMMARY OF THE INVENTION

The invention relates to methods and apparatus for investigating earth formations and in particular to methods and apparatus of the "spherical focusing" type for determining the average lateral thickness of the zone in the borehole.

In accordance with the invention, main and auxiliary currents are emitted into the media surrounding an electrode supporting structure suspended in a borehole which has been drilled into the formation. First and second signals representative of the main and auxiliary currents are produced and then combined to produce an output signal representative of the average lateral thickness of a zone in the formation.

In one embodiment of the invention, the average lateral thickness of the zone in the borehole, $Z_t$, is obtained by combining the derived measurements in accordance with the relationship:

$$\text{Log } Z_t = E \text{ Log } I_1/I_o + F \text{ Log } R_a/R_z + G$$

where $E$, $G$ and $F$ are constants, $R_z$ is a predetermined resistivity of the zone between the electrodes and the formation, $R_a$ is the resistivity of a portion of the formation and $I_1$ and $I_o$ are the auxiliary and main currents respectively. The zone consists either of the borehole mud in which case the average lateral thickness $Z_t$ corresponds to the borehole diameter, $d_h$, and $R_z$ is the resistivity of the borehole mud, $R_m$ or of the mudcake on the borehole wall in which case the average lateral thickness $Z_t$ corresponds to the average thickness of the mudcake $h_{mc}$, and $R_z$ is the resistivity of the mudcake $R_{mc}$.

For a better understanding of the present invention, together with other and further objects thereof, reference is had to the following description taken in connection with the accompanying drawings, the scope of the invention being pointed out in the appended claims.

BRIEF DESCRIPTION OF THE DRAWINGS

FIG. 3 is a flow diagram representative of a computer program for determining the diameter of a borehole.

FIG. 4 is a diagram of a pad mounted apparatus according to the invention for determining mudcake thickness.

FIG. 5 is a flow diagram representation of a computer program for determining mudcake thickness.

DESCRIPTION OF THE PREFERRED EMBODIMENT

Figure 1:
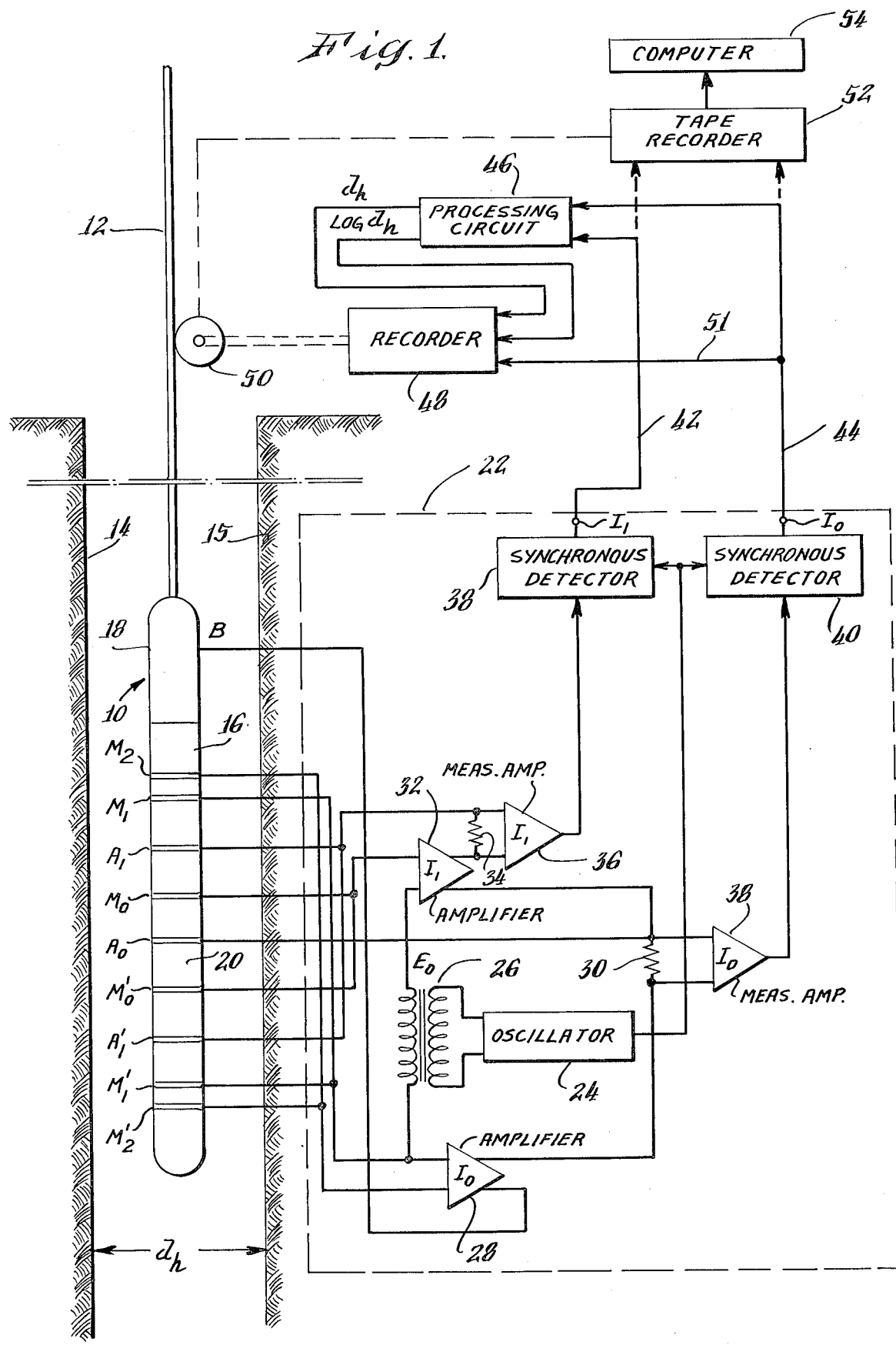
FIG. 1 is a diagram of the embodiment of a mandrel mounted apparatus according to the invention giving an indication of the diameter of a borehole.

Referring now to FIG. 1 there is shown a mandrel-mounted resistivity measuring device of the spherical focusing type which in accordance with the invention is useful in determining borehole diameter. The device 10 is suspended at the end of cable 12 in borehole 14 which has been drilled in earth formation 15. The device can be moved within the borehole in a conventional manner by reeling and unreeling cable 12 by means of a winch (not shown) located at the earth's surface. The borehole diameter is designated $d_h$. The device further comprises a body member 16 whose upper part 18 contains electrical circuits which will be described in greater detail below and is lower part 20, made of an insulating material; which carries, from top to bottom, annular electrodes $M_2$, $M_1$, $A_1$, $M_o$, $A_o$, $M'_o$, $A'_1$, $M'_1$, and $M'_2$. The electrodes $M'_o$, $A'_1$, $M'_1$ and $M'_2$ are respectively connected to the electrodes $M_o$, $A_1$, $M_1$ and $M_2$ so as to form a symmetrical system in relation to electrode $A_o$. The upper part 18 of the body member comprises current-return electrode B.

The electrodes are connected to the electronic circuits located in the upper part 18 of body member 16 which is shown for greater clarity within the dotted lines 22. The electronic circuits comprise oscillator 24 which generates a constant alternating voltage $E_o$ at the terminals of the secondary of transformer 26. Electrodes $M_1$, $M_1'$ and $M_2$, $M'_2$ are connected to the inputs of a high-gain differential amplifier 28 whose outputs are connected respectively to electrode B and to electrode $A_o$ via resistor 30 of small value. Amplifier 28 delivers main current $I_o$ which flows between electrodes $A_o$ and B. Another high-gain differential amplifier 32 whose inputs are connected to electrodes $M_o$, $M'_o$ and $M_1$, $M'_1$ via the secondary of transformer 26 delivers auxiliary current $I_1$ which flows between electrodes $A_o$ and $A_1$, $A'_1$. A low value resistor 34 is connected between the amplifier 32 and the electrode $A_1$. The input of amplifier 36 is connected across resistor 34 to measure auxiliary current $I_1$. The output of amplifier 36 is connected to a synchronous detector 38. Likewise, the terminals of resistor 30 are connected to the inputs of amplifier 38 for measuring the main current $I_o$. The output signal of the amplifier 38 is applied to a synchronous detector 40. The reference voltage from oscillator 24 is also applied to detectors 38 and 40.

The output signals of the detectors 38 and 40 are dc voltages which are representative respectively of currents $I_1$ and $I_o$. These signals are applied via conductors 42 and 44 of cable 12 to a processing circuit 46 which gives two output signals representative of the average diameter $d_h$ of the borehole. The operation of processing circuit 46 will be described in greater detail below. The signal from processing circuit 46 is applied to recorder 48 which is driven by wheel 50 in tangential friction with cable 12. Thus the borehole diameter is recorded as a function of depth. In addition, since the signal derived from conductor 44 is representative of the conductivity of the formation, recorder 48 can simultaneous record the formation conductivity as represented by line 51.

Alternatively, the output signals from detectors 38 and 40 can be applied to a digital tape recorder 52 which is driven be wheeel 50. The digital tape recorder converts the signal to digital form for recording on magnetic tape. The tape is then carried to a digital computer 54 or the data is transmitted to the computer via telemetry link. The computer is programmed to provide an output signal representative of the average borehole diameter.

Briefly, in the operation of spherical focusing type resistivity device, main current $I_o$ and auxiliary current $I_1$ are emitted from electrode $A_o$ into the media surrounding the electrode structure. The media comprises the mud in the borehole and the formation surrounding the borehole. A first control loop which in FIG. 1 comprises high-gain amplifier 28 supplies main current $I_o$ to maintain a zero potential difference between electrodes $M_1$, $M_2$ (and $M'_1$, $M'_2$). A second control loop comprising high-gain amplifier 32 supplies auxiliary current $I_1$ to maintain a constant potential $E_o$ between electrodes $M_o$, $M_1$ (and $M'_o$, $M'_1$).

By maintaining zero potential gradient between electrodes $M_1$ and $M_2$ no current will flow through the borehole in the direction parallel to the borehole axis in the vicinity of electrodes $M_1$, $M_2$ and $M'_1$, $M'_2$. Since the auxiliary current return electrodes, $A_1$, $A'_1$ are closer to electrode $A_o$ than the points of zero potential gradient and the auxiliary current return electrode B, is further from electrode $A_o$ than the points of zero potential gradient, the auxiliary current will flow primarily within the borehole and force the main current to flow primarily in the formation. Therefore by measuring the main current, the resistivity of the formation can be determined. For a more detailed description of the operation of the sperhical focusing-type electrode device refer to copending U.S. patent application Ser. No. 247,076, filed on Apr. 24, 1972 by Schuster.

If it is assumed that $I_o$ flows only in the formation and that $I_1$ flows only in the borehole, the value of the resistivity $R_a$ of the formation zone through which $I_o$ flows is given by:

$$R_a = K \frac{V_{M_o} - V_{M_1}}{I_o} \qquad (1)$$

where $K$ is a prdetermined constant dependent upon the electrode configuration of the apparatus and $V_{M_o}$ and $V_{M_1}$ are the potentials of electrodes $M_o$ and $M_1$ respectively. The potential difference $V_{M_o} - V_{M_1}$ is equal to $E_o$, therefore equation 1 can also be written as $R_a = K (E_o/I_o)$. Since $E_o$ is maintained at a known constant value, the magnitude of $R_a$ is inversely proportional to the measured value of $I_o$, hence the value of $I_o$ is a measure of the conductivity of the formation.

Assuming a cylindrical flow of auxiliary current in the borehole between electrodes $M_o$ and $A_1$ the resistance of the mud between these electrodes which is equal to $$\frac{V_{M_o} - V_{M_1}}{I_1}$$

where $V_{A_1}$ is the potential of the $A_1$ electrode is given by the following equation:

$$\frac{V_{M_o} - V_{A_1}}{I_1} = \frac{cR_m}{\frac{\pi d_h^2}{4}} \quad (2)$$

where $c$ is a porportionality constant and $R_m$ is the resistivity of the mud in the borehole. It is known that in an apparatus of this type, the magnitude of the potential at the $M_1$ (and $M'_1$ electrode) is approximately equal to the magnitude of the potential at the $A_1$ (and $A'_1$) electrode therefore equations 1 and 2 can be combined and solved for $d_h$, where:

$$d_h^2 = \frac{4c}{\pi} K \frac{R_m}{R_a} \frac{I_1}{I_o} \quad (3)$$

and since $4(cK/\pi)$ is constant, it can be replaced by the constant C and equation 3 can be rewritten in the following form:

$$\text{Log } d_h = \frac{1}{2} \text{Log} \frac{I_1}{I_o} - \frac{1}{2} \text{Log} \frac{R_a}{R_m} + \frac{C}{2}. \quad (4)$$

Equation 4 represents a formula from which the magnitude of the borehole diameter $d_h$ can be determined. It has been found in practice, however, that the assumptions made in deriving equation 4 do not always occur. For example, there is not always a cylindrical flow of $I_1$ in the borehole. Therefore, equation 4 can be rewritten in a more general form:

$$\text{Log } d_h = A \text{ Log} \frac{I_1}{I_o} + B \text{ Log} \frac{R_a}{R_m} + C \quad (5)$$

where A, B and C are constants which are dependent upon a particular electrode configuration of the apparatus. The values for constants A, B and C to be used in determining the borehole diameter can be predetermined for an apparatus with a particular electrode configuration by computing known responses of the apparatus with the particular electrode configuration for various borehole diameters and ratios of formation resistivities $R_t$ to to mud resistivity, $R_m$. For each considered borehole diameter and ratio of $R_t/R_m$ values for $R_a/R_m$ and $I_1/I_o$ are computed. These values are then used in equation 5 to obtain simultaneous equations involving A, B and C as unknowns. The values of A, B, and C are determined using well known mathematical techniques as those giving the best average results.

Figure 2:
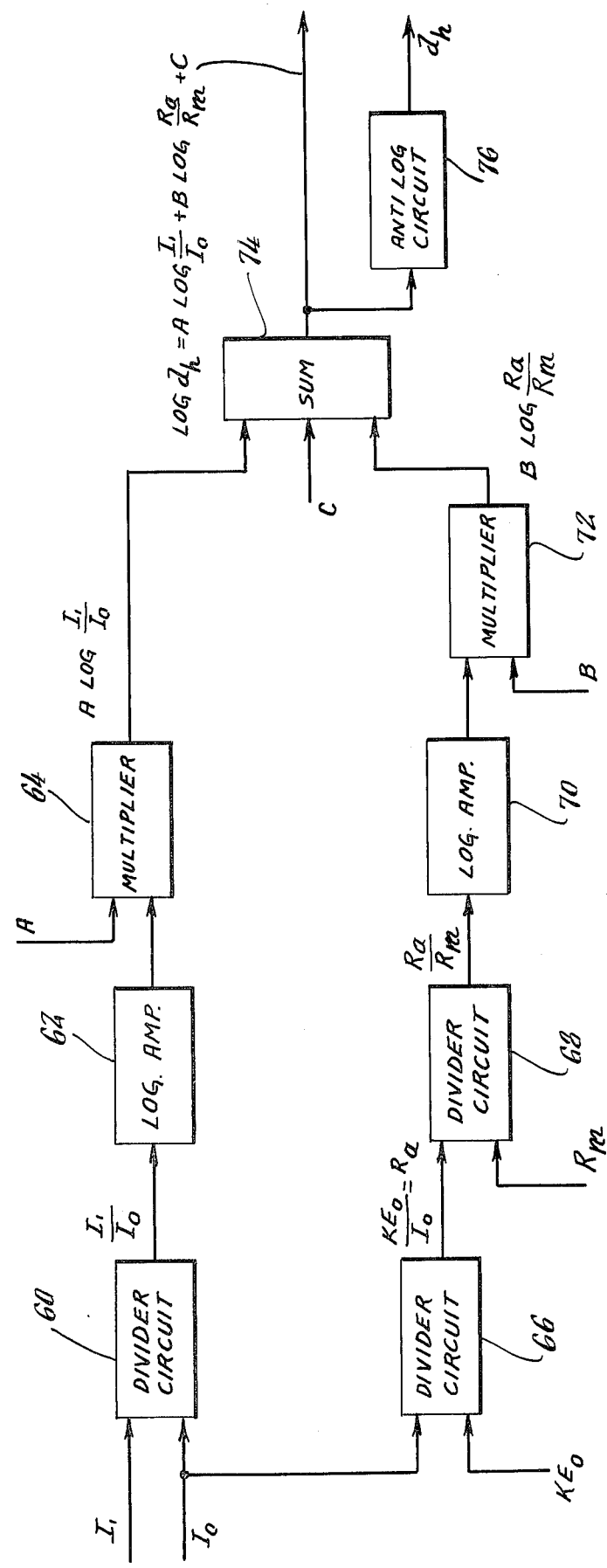
FIG. 2 is a schematic representation showing in greater detail a portion of FIG. 1.

Referring now to FIG. 2 there is shown in greater detail processing circuit 46. As shown, the outputs of detectors 38 and 40, $I_1$ and $I_o$ are applied to divider circuit 60. The output $I_1/I_o$ of divider circuit 60 is applied to logarithmic amplifier 62, the output of which is multiplied by the predetermined constant A in multiplier circuit 64. The signal $I_o$ is also applied to divider circuit 66 wherein the predetermined constant $KE_o$ is divided by $I_o$. The output of divider circuit 66 is therefore equal to the resistivity $R_a$. That signal is then applied to divider circuit 68, the output of which $R_a/R_m$ is applied to logarithmic amplifier 70. The output of amplifier 70 is multiplied by the predetermined constant B in multiplier circuit 72. The outputs of multiplier circuit 64 and 72 and the predetermined constant C are added in summing circuit 74 which provides the output signal representative of log $d_h$ to the recorder. In addition, the output signal from summing circuit 74 can be applied to an anti-logarithmic circuit 76 to provide a signal representative of the borehole $d_h$.

Values for log $d_h$ and $d_h$ can also be obtained by use of an appropriately programmed general-purpose computer. Referring now to FIG. 3 there is shown a flow diagram representation of a computer program. The program is entered via block 80 and the constant parameter if $R_m$, $E_o$, K, A, B and C are read, block 82. Next $I_1$ and $I_o$ for the first depth level is read, block 84. The borehole diameter for the first depth level is then computed using equation 5, block 86, after which decision element 88 asks if this is the last depth level. If it is not, NO answer the depth level is incremented, block 90 and the program returns to block 84 to compute the borehole diameter at the next depth level. After all the depth levels have been considered, YES answer from decision element 88, the values of log $d_h$ and $d_h$ for each depth level are printed out, block 92 and the program exits, block 94.

In addition to determining the borehole diameter, the spherical focusing type electrode exploring device can also be used to determine mudcake thickness. Referring to FIG. 4, there is shown a pad mounted electrode device which can be utilized for determining mudcake thickness.

The device 100 is represented suspended on the end of cable 102 in borehole 104. The mudcake 106 having thickness $h_{mc}$ has been formed on the wall of the borehole during drilling. The apparatus 100 can be moved within the borehole in a conventional manner by reeling or unreeling the cable by means of a winch (not shown) located at the surface. The device comprises a body member 108 whose upper part 110 contains electric circuits which will be described later and whose lower part 112 contains pads 114 and 116 articulated on the body member by means of arms 118. The pads 114 and 116 are adapted to be applied aginst the wall of the borehole 114, for example by the action of springs 120. These pads may, generally be retracted along the body member by the action of a conventional hydraulic system (not shown) located in the upper part 110 of body member 108. The apparatus 100 shown schematically in FIG. 4 can be constructed according to the technique described in U.S. patent application Ser. No. 52,869 filed on July 7, 1970 by Planche.

Pads 114 and 116 are measuring pads equipped with current-emitting or current-return electrodes and potential electrodes. Only the electrodes of pad 116 are shown for simplicity. A first electrode $A_o$ is placed substantially at the center of the pad with four other electrodes $M_o$, $A_1$, $M_1$ and $M_2$ surrounding the central electrode $A_o$ at respective increasing distances from the central electrode. These electrodes can, in particular, have a retangular form such as shown and described in the above referenced Schuster patent application. The body member 108 comprises a current-return electrode B.

These electrodes are connected to electric circuits contained in the upper part 110 of body member 108 which is shown for greater clarity in the right-hand part of FIG. 4. These circuits include oscillator 122 which provides a constant output voltage, $E_o$ across the primary of transformer 124. One terminal of the secondary of transformer 124 is connected to electrode $M_1$, the other terminal to an input of a high gain differential amplifier 126. The other input to amplifier 126 is connected to the electrode $M_o$. One output of this amplifier is connected to the electrode $A_o$ and the other output to a junction point 128. The electrodes $M_1$ and $M_2$ are connected to the input of high-gain differential amplifier 130 whose outputs are connected respectively to the electrode B consisting of body member 108 and to junction point 128 via resistor 132 of low resistance. The electrode $A_1$ is also connected to junction point 128 via resistor 134 of low resistance. The ends of resistor 132 are connected to the inputs of an amplifier 136 whose output is applied to a synchronous detector 138. The reference signal from detector 138 comes from oscillator 120 via a conductor 140.

In operation, a main current $I_o$ and an auxiliary current $I_1$ are emitted from electrode $A_o$ into the media surrounding the electrode system. The media comprises the mudcake on the borehole wall and the formation relatively near the pad. A first control loop comprising a high-gain amplifier 130 maintains a zero potential difference between electrodes $M_1$ and $M_2$ and a second control loop comprising amplifier 126 maintains a constant potential difference $E_o$ between the electrode $M_o$ and the electrode $M_1$. It will be noted that in a circuit shown in FIG. 4, the amplifier 126 delivers a total current ($I_1 + I_o$) while amplifier 130 delivers the current $I_o$ although the latter is connected between the electrodes $A_1$ and B. The potential distribution set up in the borehole causes auxiliary current $I_1$ to flow primarily in the mudcake thereby forcing main current to flow in the formation.

Amplifier 136 delivers an AC signal representative of the main current $I_o$ which is rectified in a synchronous detector 138. As the voltage between the electrodes $M_o$ and $M_1$ is kept constant and equal to $E_o$, the DC voltage appearing at the output of detector 138 is proportional to the ratio $E_o/I_o$; i.e. representative of the conductivity of the formation traversed by the main current $I_o$. Since $I_o$ flows primarily in the formation, the output voltage of detector 138 is relatively uninfluenced by any mudcake which is located between the pad and the permeable formation.

In addition, measurement amplifier 142 whose input is connected across resistor 134 provides an output signal representative of the auxiliary current $I_1$. The output signals of detector 138 and amplifier 142 are transmitted to the surface via a single conductor 144 of cable 102. The two signals $I_o$ and $I_1$ are separated on the surface by a low-pass filter 144 and a high-pass filter 150. The output of the high-pass filter is connected to a rectifier 152.

To improve the accuracy of the measurement it is possible to replace rectifier 152 by a synchronous detector so that only the component of the auxiliary current $I_1$ in phase with voltage $E_O$ is transmitted to the surface. The use of a synchronous downhole detector, however, would require two conductors for transmitting $I_1$ and $I_O$ to the surface since both would then appear in the form of DC voltages.

The output of low pass filter 144 and rectifier 152 are connected to a processing circuit 154, similar to processing circuit 46, which provides two output signals representative of the mudcake thickness, $h_{mc}$. The output signals from processing circuit 154 are applied to a recorder 156 which is driven a function of depth by wheel 158 in tangential friction with cable 102. A signal derived from low pass filter 144 is also representative of the conductivity of the formation near the borehole and can be recorded simultaneously with the value of mudcake thickness, as represented by line 159.

Alternatively, the signals from rectifier 152 in low pass filter 144 can be applied to a digital tape recorder 160 which is also driven as a function of depth. The data from the magnetic tape can then be inputed to digital computer 162 which is programmed to provide an output representative of the mudcake thickness of the borehole.

By using an analysis similar to that used for the measurements from a mandrel mounted electrode device, an equation for mudcake thickness of the following form can be derived:

$$\text{Log } h_{mc} = \alpha \text{ Log } I_1/I_o + \beta \text{ Log } R_o/R_{mc} + \gamma \quad (6)$$

where $\alpha$, $\beta$ and $\gamma$ are constants, $R_{mc}$ is the resistivity of the mudcake which can be measured or is predetermined by the log analyst and $R_o$ is the resistivity of the portion of the formation through which $I_o$ flows. Values of $\alpha$, $\beta$, and $\gamma$ are predetermined from the known response of electrical device having a particular electrode configuration using the same techniques as described in connection with determining constants A, B and C for the mandrel mounted device.

Values of $h_{mc}$ and log $h_{mc}$ are obtained from processing circuit 154 which is identical with processing circuit 46 shown in FIG. 2, with the exception of the input constants. Thus constant multipliers inputed to multipliers 64 and 72 are changed from A and B to $\alpha$ and $\beta$ respectively. The constant C introduced into the sum circuit 74 is replaced by $\gamma$ and $R_m$ introduced into the divider circuit 68 is replaced by $R_{mc}$. With these exceptions, the operation of processing circuit 154 is the same as that of processing circuit 46 which has been previously described. The output of the processing circuit 154 are log $h_{mc}$ and $h_{mc}$ which are applied to recorder 156.

Alternatively, digital computer 162 can be programmed to provide an output of log $h_{mc}$ and $h_{mc}$ for each depth level. The program is similar to that shown in FIG. 3 for determining the borehole diameter. A flow diagram representation of the program is shown in FIG. 5. Referring to FIG. 5, the program is entered via block 170 after which the constant parameters are read, block 172. Next, the first level of data, $I_1$ and $I_O$ is read, block 174. As represented by block 176, log $h_{mc}$ is computed using equation 6 and from that $h_{mc}$ is computed. Decision element 178 next asks if this is the last depth level and if not, the depth level is incremented, block 180 and the program returns to block 174 to process the next level of data. After all the depth levels have been processed, the program prints out log $h_{mc}$ and $h_{mc}$ for each depth level, block 182 and the program exits, block 184.

As can be seen from the above described examples, the invention can have many variations. Thus, the electronic circuits for the mandrel-mounted and pad-mounted devices can have either of the configurations described herein. Other embodiments are described in the above Schuster patent application. In addition to the "constant voltage $E_o$" or "constant main current $I_o$" systems, it is possible to conceive of other systems in which, for example, the auxiliary current $I_1$ is kept constant. The first and second signals would then be respectively representative of $E_O$ and $I_O$, the resistivity being obtained by calculating $E_O$ from $I_O$ and the values of $I_O$ and $I_1$ being used to compute the desired parameter in either borehole diameter or mudcake thickness. It is also possible to keep the total current $(I_1 + I_O)$ constant or to maintain a relationship between $I_O$ and $E_O$ (for example $E_O$ or $I_O$ are equal to constant) or even relationship between $I_1$ and $E_O$.

What I claim is:

1. An apparatus for investigating earth formations traversed by a borehole comprising:
    (a) means for supporting a plurality of electrodes adapted for movement in the borehole, the electrodes comprising at least one current-emitting electrode adapted for emitting current into the borehole and a plurality of potential measuring electrodes;
    (b) means for emitting a main current and an auxiliary current from said current-emitting electrode;
    (c) a first control loop for maintaining a first potential difference between two measure electrodes in one portion of the borehole;
    (d) a second control loop for maintaining a second potential difference between two measure electrodes in a second portion of the borehole; said first and second control loops arranged to produce auxiliary current flow primarily in the borehole and main current flow primarily in the formation surrounding the borehole;
    (e) means for measuring the main current;
    (f) means for measuring the auxiliary current;
    (g) means for combining the measurements of the main and auxiliary currents to produce a signal representative of the resistivity of a portion of the formation; and
    (h) means for combining said signals representative of the main and auxiliary currents and the signal representative of the resistivity of the portion of the borehole to produce an output signal representative of the average lateral thickness of a zone in the formation.

2. An apparatus for investigating earth formations traversed by a borehole comprising:
    (a) means for supporting a plurality of electrodes adapted for movement in the borehole, the electrodes comprising at least one current-emitting electrode adapted for emitting current into the borehole, current return electrodes and a plurality of potential measuring electrodes;
    (b) means for emitting a main current and an auxiliary current from said at least one current-emitting electrode;
    (c) means for adjusting the potential difference between selected potential measuring electrodes to produce auxiliary current flows primarily in the media adjacent to the electrodes and main current flow primarily in the formation surrounding the electrodes;
    (d) means for measuring said main and auxiliary currents;
    (e) means for combining the measurments of the main and auxiliary currents to produce a signal representative of the resistivity of a portion of the formation; and
    (f) means for combining the measurements of main and auxiliary current with the signal representative of the resistivity to produce an output signal representative of the average lateral thickness of the zone of the formation.

3. A method for investigating subsurface earth formations traversed by a borehole comprising:
    (a) moving a plurality of electrodes through the borehole, the electrodes including at least one current-emitting electrode adapted for emitting current into the media surrounding the electrodes and a plurality of potential measuring electrodes;
    (b) emitting a main current and an auxiliary current from said current-emitting electrode;
    (c) maintaining a first potential difference between two measure electrodes in one portion of the borehole;
    (d) maintaining a second potential difference between two measure electrodes in a second portion of the borehole, said first and second potential differences cooperating to produce auxiliary current flow primarily in the borehole and main current flow primarily in the formation surrounding the borehole;
    (e) measuring the main current;
    (f) measuring the auxiliary current;
    (g) combining the measurements of the main and auxiliary currents to produce a signal representative of the resistivity of a portion of the formation; and,
    (h) combining said signals representative of the main and auxiliary currents and the signal representative of the resistivity of the portion of the borehole to produce an output signal representative of the average lateral thickness of a zone in the formation.

4. A method for investigating earth formations traversed by a borehole, comprising:
    (a) moving a plurality of electrodes through the borehole, the electrodes including at least one current-emitting electrode adapted for emitting current into the media surrounding the electrodes and current return electrodes and a plurality of potential measuring electrodes;
    (b) emitting a main current and auxiliary current from said at least one current-emitting electrode;
    (c) adjusting the potential difference between selected potential measuring electrodes to produce auxiliary current flow primarily in the borehole surrounding the electrodes and main current flow primarily in the formation surrounding the borehole;
    (d) measuring said main and auxiliary currents;
    (e) combining the measurements of the main and auxiliary currents to produce a signal representative of the resistivity of a portion of the formation; and,
    (f) combining the measurements of the main and auxiliary currents with the signal representative of the resistivity to produce an output signal representative of the average lateral thickness of a zone formation.

5. An apparatus for investigating earth formations traversed by a borehole comprising:
    (a) means for supporting a plurality of electrodes adapted for movement in the borehole, the electrodes comprising at least one current-emitting electrode adapted for emitting current into the borehole and a plurality of potential measuring electrodes;
    (b) means for supplying both survey and auxiliary currents to said current-emitting electrode for emission into the media surrounding the supporting means, said survey current returning to a first return electrode for return to the current supplying means and said auxiliary current returning to at least one return electrode located relatively near said current-emitting electrode for return to the current supply means;

(c) means for measuring the potential at a plurality of points along said supporting means;

(d) means operative in response to the measured potentials for adjusting one of the survey or auxiliary currents to set up a given potential distribution in at least a portion of the borehole whereby the auxiliary current will tend to force the survey current into the formation;

(e) means for producing first and second signals functionally related to the main and auxiliary currents; and (f) means for combining said first and second signals to produce an output signal representative of the average lateral thickness of a zone in the formation.

6. The apparatus of claim 5 further including means for producing a third signal functionally related to the resistivity of the formation and means for combining said third signal with said first and second signals to produce said output signal.

7. The apparatus of claim 6 wherein said output signal is representative of the borehole diameter.

8. The apparatus of claim 5 wherein said output signal is representative of the mudcake thickness.

9. A method of measuring a characteristic of earth formations traversed by a borehole comprising:

(a) moving a plurality of electrodes through said borehole, the electrodes including at least one current-emitting electrode adapted for emitting current into the media surrounding the electrodes and a plurality of potential measuring electrodes;

(b) supplying survey and auxiliary currents to at least one of said electrodes for emission into the media surrounding the electrodes, said survey current returning to a first return electrode for return to the current supply means and said auxiliary current returning to at least one electrode which is relatively near said at least one current-emitting electrode for return to the current supply means;

(c) measuring the potential at a plurality of points along said borehole;

(d) adjusting one of said survey or auxiliary currents in response to said measured potentials to set up a given potential distribution in at least a portion of the borehole so that the auxiliary current will tend to force the survey current into the formation;

(e) producing first and second signals functionally related to said main and auxiliary currents; and (f) combining said first and second signals to produce an output signal representative of the average lateral thickness of a zone in the formation.

10. The method of claim 9 further including the step of producing a third signal representative of the resistivity of the formation and combining said third signal with said first and second signals to produce said output signal.

11. The method of claim 10 wherein said output signal is representative of the borehole diameter.

12. The method of claim 9 wherein said output signal is representative of the mudcake thickness.

13. An apparatus for investigating earth formations traversed by a borehole comprising:

(a) means for supporting a plurality of electrodes adapted for movement in the borehole, the electrodes comprising at least one current-emitting electrode adapted for emitting current into the borehole and a plurality of potential measuring electrodes;

(b) means for supplying both survey and auxiliary currents to said current-emitting electrode for emission into the media surrounding the supporting means, said survey current returning to a first return electrode for return to the current supply means and said auxiliary current returning to at least one return electrode located relatively near said current-emitting electrode for return to the current supply means;

(c) means for measuring the potential at a plurality of points along said supporting means;

(d) means operative in response to the measured potentials for adjusting one of the survey or auxiliary currents to set up a given potential distribution in at least a portion of the borehole whereby the auxiliary current will tend to force the survey current into the formation;

(e) means for producing first and second signals functionally related to the main and auxiliary currents; and (f) means for combining said first and second signals to produce an output signal functionally related to the presence of mudcake on the borehole wall.

14. A method of measuring a characteristic of earth formations traversed by a borehole comprising:

(a) moving a plurality of electrodes through said borehole, the electrodes including at least one current-emitting electrode adapted for emitting current into the media surrounding the electrodes and a plurality of potential measuring electrodes;

(b) supplying survey and auxiliary currents to at least one of said electrodes for emission into the media surrounding the electrodes, said survey current returning to a first return electrode for return to the current supply means and said auxiliary current returning to at least one electrode which is relatively near said at least one current-emitting electrode for return to the current supply means;

(c) measuring the potential at a plurality of points along said borehole;

(d) adjusting one of said survey or auxiliary currents in response to said measured potentials to set up a given potential distribution in at least a portion of the borehole so that the auxiliary current will tend to force the survey current into the formation;

(e) producing first and second signals functionally related to said main and auxiliary currents; and (f) combining said first and second signals to produce an output signal functionally related to the presence of mudcake on the borehole wall.

* * * * *